US009262035B1

(12) United States Patent
Gustafson et al.

(10) Patent No.: US 9,262,035 B1
(45) Date of Patent: Feb. 16, 2016

(54) DISPLAY FOR EMBEDDED INTELLIGENCE

(75) Inventors: Paul Gustafson, Moraga, CA (US); Hob Anthony Spillane, Hellertown, PA (US); Jun Chen, Pleasanton, CA (US); Khurram Mahmood, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 105 days.

(21) Appl. No.: 13/443,200

(22) Filed: Apr. 10, 2012

(51) Int. Cl.
G06F 3/048 (2013.01)
G06F 17/25 (2006.01)

(52) U.S. Cl.
CPC .................................... G06F 3/048 (2013.01)

(58) Field of Classification Search
CPC ....................................................... G06F 3/048
USPC .......................................................... 715/803
See application file for complete search history.

(56) References Cited

U.S. PATENT DOCUMENTS

| 6,073,163 | A | 6/2000 | Clark et al. |
| 6,269,355 | B1 | 7/2001 | Grimse et al. |
| 6,765,689 | B1 | 7/2004 | Benstein |
| 7,603,375 | B2 | 10/2009 | Ng et al. |
| 8,024,651 | B1 * | 9/2011 | Error ................ G06F 17/30994 715/212 |
| 2001/0043235 | A1 * | 11/2001 | Best et al. ..................... 345/781 |
| 2001/0051949 | A1 | 12/2001 | Carey et al. |
| 2002/0052771 | A1 | 5/2002 | Bacon et al. |
| 2002/0069214 | A1 | 6/2002 | Smith et al. |
| 2003/0140089 | A1 | 7/2003 | Hines et al. |
| 2004/0001092 | A1 | 1/2004 | Rothwein et al. |
| 2004/0019809 | A1 | 1/2004 | Sheinis et al. |
| 2004/0024622 | A1 | 2/2004 | Knight |
| 2004/0049436 | A1 | 3/2004 | Brand et al. |
| 2004/0179017 | A1 * | 9/2004 | Martyn et al. ................ 345/536 |
| 2005/0216282 | A1 | 9/2005 | Chen et al. |
| 2006/0085243 | A1 * | 4/2006 | Cooper et al. .................... 705/8 |
| 2006/0143220 | A1 | 6/2006 | Spencer, Jr. |
| 2007/0106642 | A1 | 5/2007 | Kovrigin et al. |
| 2007/0250840 | A1 | 10/2007 | Coker et al. |
| 2007/0266054 | A1 | 11/2007 | Stephens et al. |

(Continued)

OTHER PUBLICATIONS

David Gotz et al. "Harvest: An Intelligent Visual Analytic Tool for the Masses" Published in Proceeding IVITA '10 Proceedings of the first international workshop on Intelligent visual interfaces for text analysis, Feb. 7, 2010, ISBN: 978-1-60558-996-1 (pp. 1-4).*

(Continued)

*Primary Examiner* — Jennifer To
*Assistant Examiner* — Xuyang Xia
(74) *Attorney, Agent, or Firm* — Van Pelt, Yi & James LLP

(57) ABSTRACT

A system for displaying an embedded intelligence applet comprises a processor and a memory. The processor is configured to provide display information to display in the embedded intelligence applet window and to provide an indication to display the embedded intelligence applet window in an opaque mode. The processor is configured to determine whether an indication to activate a window other than the embedded intelligence applet window is received. The processor is configured to provide an indication to display the embedded intelligence applet window in a partially transparent mode in the event that an indication to activate a window other than the embedded intelligence applet window is received. The memory is coupled to the processor and is configured to provide the processor with instructions.

19 Claims, 6 Drawing Sheets

(56) References Cited

U.S. PATENT DOCUMENTS

| | | |
|---|---|---|
| 2008/0015929 A1* | 1/2008 | Koeppel et al. ............... 705/10 |
| 2008/0046805 A1 | 2/2008 | Shewchenko et al. |
| 2009/0276771 A1* | 11/2009 | Nickolov et al. ............. 717/177 |
| 2010/0017783 A1 | 1/2010 | Brininstool et al. |
| 2010/0100427 A1 | 4/2010 | McKeown et al. |
| 2010/0190475 A1* | 7/2010 | El-Kadri et al. ........... 455/412.2 |
| 2012/0226623 A1 | 9/2012 | Jurney et al. |

OTHER PUBLICATIONS

Skarnes et al., Method and Apparatus for Applet-Generated Screen Displays Using Computer Database and Programming Language, Oct. 25, 2001, WIPO.

* cited by examiner

400

Modify Base Salary Business Process

Employee Name:

[ Jane Smith ]

402

Modify Base Salary
Embedded Intelligence Applets

Employee Current Salary:

$ 122,000 yearly

Employee Name: Jane Smith
Employee Type: Engineer

Engineer Salary Frequencies:

Employee New Salary:

[ Enter New Salary ]

```
9
7
5
3
1
   70k  90k  110k 130k
```

Jane Smith Salary History:

Engineer Salary Modification Chart:

[ DONE ]

Fig. 4

DISPLAY FOR EMBEDDED INTELLIGENCE

BACKGROUND OF THE INVENTION

A business manager makes many complex decisions over the course of each day. Enterprise business software has come to be relied upon for assisting a manager with his decision making by presenting him with data relevant to these decisions. For example, a manager who is considering giving an employee a raise might want to see data regarding the amount and timing of raises given to employees in the past, sorted by business division and employee performance level. Typically, separate software applications, or separate parts of a single application, are used for entering business decisions and for viewing data relevant to those business decisions. It can become awkward for the user to coordinate task and application switching in order to view the desired data while accessing the necessary data entry fields.

BRIEF DESCRIPTION OF THE DRAWINGS

Various embodiments of the invention are disclosed in the following detailed description and the accompanying drawings.

FIG. 4 is a diagram illustrating an embodiment of a business process including an embedded intelligence applet window displaying in a transparent mode.

DETAILED DESCRIPTION

Figure 1:
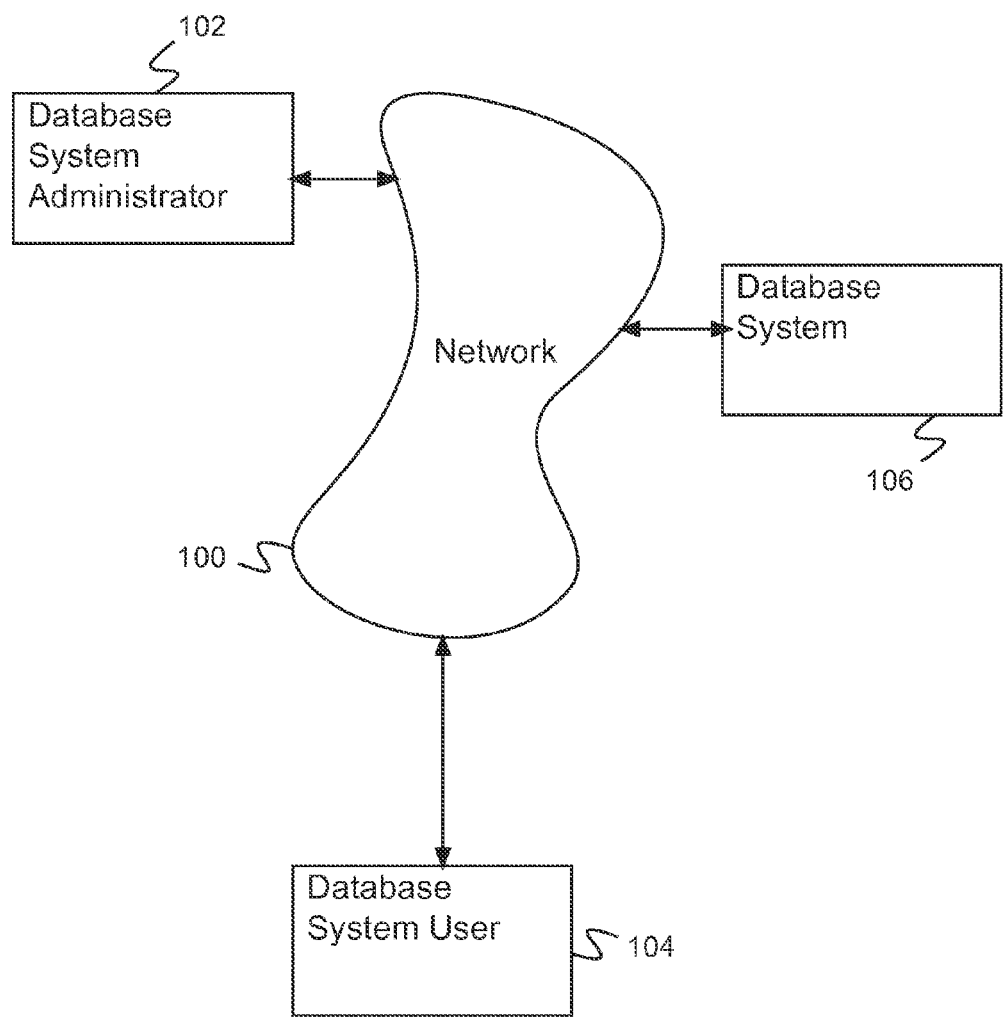
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A display for embedded intelligence is disclosed. A system for displaying an embedded intelligence applet includes a processor configured to provide display information to display in the embedded intelligence applet window. The processor is further configured to provide an indication to display the embedded intelligence applet window in an opaque mode. The processor is further configured to determine whether an indication to activate a window other than the embedded intelligence applet window is received. The processor is further configured to provide an indication to display the embedded intelligence applet window in a partially transparent mode. The system additionally comprises a memory coupled to the processor and configured to provide the processor with instructions.

In some embodiments, a software application comprises a database, a set of business processes, and a set of embedded intelligence applets. Each business process modifies or accesses data stored in the database to accomplish a business process (e.g., hire an employee, modify the salary of an employee, give an employee a promotion, etc.). Business processes can receive input data (e.g., employee name, new employee salary, new employee title, etc.) from a business process user. Each embedded intelligence applet prepares a report on data stored within the database to assist a business manager with the decisions made in the business processes. An embedded intelligence applet may include a set of prompts, variables that need to be supplied to the embedded intelligence applet in order for it to run. The embedded intelligence applets are made available automatically for the user of the business process so that no switching to another application is necessary in order for the functionality of the embedded intelligence applet to be visible, available, or interactive for the user. In various embodiments, the embedded intelligence applet is automatically triggered, is automatically made visible, is automatically made to be interactive with the user, is automatically launched, is automatically updated based on new values of input or updated input, or any other appropriate trigger. When an embedded intelligence applet is added to a business process, the prompts are associated with business process exposed fields. Business process exposed fields comprise data fields made available by the business process for use by embedded intelligence applets. Upon execution of the business process and the embedded intelligence applet, data for the embedded intelligence applet prompts is received from the associated business process exposed fields. For example, an embedded intelligence applet takes as an input an output provided by exposed fields that are available from a business process. These fields comprise available variables from the business process that can be output to provide input values to the embedded intelligence applet. The embedded intelligence applet retrieves data (e.g., from a data storage or from a database using a search based on an input object, an attribute of the input object, or an attribute of an object related to an input object, etc.) and prepares a report based on data received from the business process and on the retrieved data. Embedded intelligence applets are thus able to provide supplementary information to assist in the execution of a business process. In some embodiments, the supplementary information available to the embedded intelligent applet comprises data available to the user according the security policy (e.g., personal data or data associated with the user, data available to the role the user is associated with, etc.).

In some embodiments, the business process with its associated embedded intelligence applet has the ability to add/remove steps in the business process and yet still allow the embedded intelligence applet to trigger where their prompts have been satisfied (e.g., the linkage from exposed fields of the business process are output or transferred to the embedded intelligence applet as inputs).

In some embodiments, the business process with its associated embedded intelligence applet has the ability to add/remove steps in the business process and yet still allow the embedded intelligence applet to trigger where their prompts have been satisfied (e.g., the linkage from exposed fields of the business process are output or transferred to the embedded intelligence applet as inputs).

In some embodiments, a display for embedded intelligence comprises a display for a business process. In some embodiments, a display for a business process comprises displayed business process data and displayed business process data entry fields. In some embodiments, a display for embedded intelligence additionally comprises an embedded intelligence applet display button. In some embodiments, when an indication to the embedded intelligence applet display button is received, an embedded intelligence applet window is displayed. An embedded intelligence applet window displays one or more embedded intelligence applets (e.g., embedded intelligence applets providing supplementary information to assist in the execution of a business process). In some embodiments, when the embedded intelligence applet window is displayed, it is displayed in an opaque mode (e.g., obscuring information displayed by windows behind it). In some embodiments, when an indication to activate a window other than the embedded intelligence applet window is received, the embedded intelligence applet window is displayed in a partially transparent mode (e.g., revealing information displayed by windows behind it). In some embodiments, when an indication to reactivate the embedded intelligence applet window is received, the embedded intelligence applet window is displayed in the opaque mode.

In some embodiments, the embedded intelligence applet displays information within a pre-defined area on the main transaction display or window (e.g., not in a separate window). In some embodiments, content of the embedded intelligence applet is updated automatically—for example, when relevant fields are changed on the underlying business process edit page (e.g., by a user editing them), embedded applets are updated to reflect the change in real time. In some embodiments, a user can hide (deactivate) individual embedded intelligence applet (e.g., worklet) in the applet window; When a hidden applet changes, an indication is shown to the user that the applet changed. A user may click on a button to show (reactivate) the updated applet.

FIG. 1 is a block diagram illustrating an embodiment of a network system. In the example shown, the network system comprises database system administrator 102, database system user 104, and database system 106, communicating via network 100. In various embodiments, network 100 comprises one or more of the following: a local area network, a wide area network, a wired network, a wireless network, the Internet, or any other appropriate network. Database system 106 comprises a database system for storage and retrieval of information. In some embodiments, database system 106 comprises a system for analysis of information. In some embodiments, database system 106 comprises a distributed database, e.g., a database system comprising multiple computers not necessarily in the same location. In some embodiments, database system 106 comprises a system for executing business processes. In some embodiments, database system 106 comprises a system for executing embedded intelligence applets. In some embodiments, database system 106 comprises a system for a process for embedded intelligence.

Database system administrator 102 comprises a database system administrator administrating database system 106. In some embodiments, database system administrator 102 comprises an employee at a company purchasing database system services. In some embodiments, administrating database system 106 comprises preparing, configuring, or modifying database system 106 as desired by database system users (e.g., database system user 104). In some embodiments, database system administrator 102 configures and modifies database system 106 in ways not available to database system user 104. Database system user 104 comprises a database user accessing database services on database system 106. In some embodiments, database system user 104 comprises a user who uses a user interface (e.g., a keyboard, a touch screen, a display, etc.) to interact with database system 106. In various embodiments, the user interface is associated with a desktop computer, a laptop computer, a local terminal, or any other appropriate system with a user interface. In some embodiments, database system user 104 comprises an employee at a company purchasing database system services. In various embodiments, there are 1, 2, 4, 13, 22, 115, or any other appropriate number of database system users accessing database services on database system 106. In some embodiments, each database system user only has access to their own data stored on database system 106 and is able to utilize database system 106 as though they are the sole database system user (e.g., a person user, a member of a company user, etc.). In some embodiments, database system user 104 configures services on database system 106. In some embodiments, the ability of database system user 104 to configure database system 106 is limited compared with that of database system administrator 102. In some embodiments, a database system user (e.g., database system user 104) comprises a person accessing database system 106 via a user interface, e.g., a web page. In some embodiments, a database system user comprises an automated system accessing database system 106 via a machine interface, e.g., a public application programming interface (API).

Figure 2:
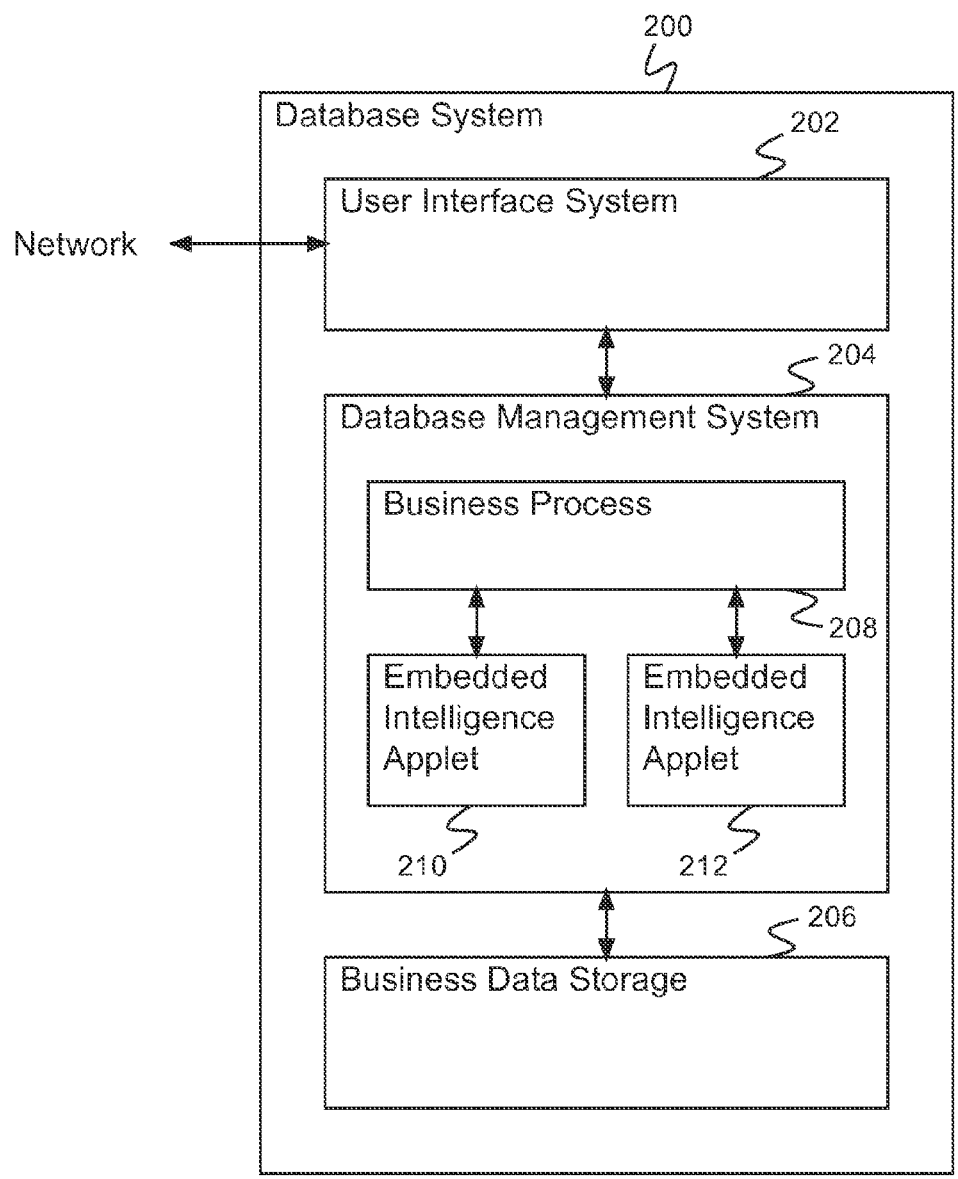
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, user interface system 202 communicates with a network, e.g., network 100 of FIG. 1. User interface system 202 comprises a system for interacting with a user over a network, e.g., a web page server. In various embodiments, a user uses user interface system 202 for querying database system 200, initiating jobs running on database system 200, modifying jobs running on database system 200, uploading data to database system 200, configuring database system 200, scheduling jobs to run at a particular time on database system 200, scheduling jobs to run at recurring intervals on database system 200, or any other appropriate use. Database management system 204 comprises a system for managing database system 200. Database management system 204 comprises software for organizing data, retrieving data, processing data, storing data, preparing reports from data, analyzing data, interpreting data, or any other appropriate function. Data is stored in business data storage 206. In some embodiments, database system 200 comprises an object-oriented database. In some embodiments, database system 200 comprises a distributed database.

In the example shown, database management system 204 comprises business process 208, embedded intelligence applet 210, and embedded intelligence applet 212. In some embodiments, database management system 204 includes more than one business process. In various embodiments, database management system 204 comprises 1, 2, 4, 7, 11, 14, 22, 315, 1009, 3021, or any other appropriate number of business processes. A business process comprises software for executing a business task, e.g., hiring an employee, modifying the salary of an employee, giving an employee a promotion, transferring an employee between business divisions, or any other appropriate business task. Business processes contain a number of fields to be filled out in the course of executing the business process, e.g., employee name, new employee salary, new employee title, new employee business division, or any other appropriate business process field. In some embodiments, a business process is broken into a set of pages, each comprising a subset of the business task and data entry fields. Embedded intelligence applet 210 and embedded intelligence applet 212 communicate with business process 208. Database management system 204 comprises any appropriate number of embedded intelligence applets. Each embedded intelligence applet (e.g., embedded intelligence applet 210, embedded intelligence applet 212) communicates with any appropriate number of business processes (e.g., business process 208). In various embodiments, database management system 204 comprises 1, 3, 4, 6, 12, 22, 222, 515, or any other appropriate number of embedded intelligence applets. An embedded intelligence applet comprises software for analyzing data and preparing a report embedded with a business process. In some embodiments, an embedded intelligence applet is referred to as a worklet. When a database system user (e.g., database system user 104 of FIG. 1) accesses the database system (e.g., database system 106 of FIG. 1) and executes a business process (e.g., business process 208), embedded intelligence applets communicating with the business process (e.g., embedded intelligence applet 210, embedded intelligence applet 212) are shown embedded in the business process. The embedded intelligence applets are designed to provide the database system user with intelligence in order to assist with decisions made during the execution of the business process. For instance, a salary modification business process requires the database system user to input the new salary as part of the process, thus the user must decide what the new salary ought to be. An embedded intelligence applet embedded with the salary modification process prepares information relevant to that decision, e.g., job performance of the employee, recent salary modifications of employees in the same division, average time between salary modifications and time since the employee's last salary modification, or any other appropriate information.

In some embodiments, the embedded intelligence applet provides information by receiving the input information associated with the process and looks for related information in the database. For example, in the event that a raise process is being used, the applet provides salary data for employees with the same job classification (e.g., laterally relevant data), provides employee salary data (e.g., background data, or vertically relevant data, etc.), provides employee data for those with salary similar to the contemplated raise salary (e.g., forecasted laterally relevant data), or any other appropriate data. In some embodiments, related information comprises results from a search on a database (e.g., an object database). In some embodiments, the search on the database comprises a search based at least in part on an attribute of an object received as an input object. In some embodiments, the search on the database comprises a search based at least in part on an attribute of an object related to the input object.

Embedded intelligence applet 210 and embedded intelligence applet 212 receive data from business process 208 as part of their data analysis and report preparation. For instance, when a user enters an employee name into a modify employee salary process, embedded intelligence applet 210 and embedded intelligence applet 212 receive the employee name and can execute further data analysis and report preparation based on it, e.g., finding the performance records of the employee and presenting them to the database user. In some embodiments, database management system 204 comprises a processor configured to receive an input data for a business process (e.g., business process 208), receive a stored data (e.g., from business data storage 206) for an embedded intelligence applet (e.g., embedded intelligence applet 210 or embedded intelligence applet 212), and determine display information for the embedded intelligence applet based at least in part on the input data and the stored data.

Figure 3:
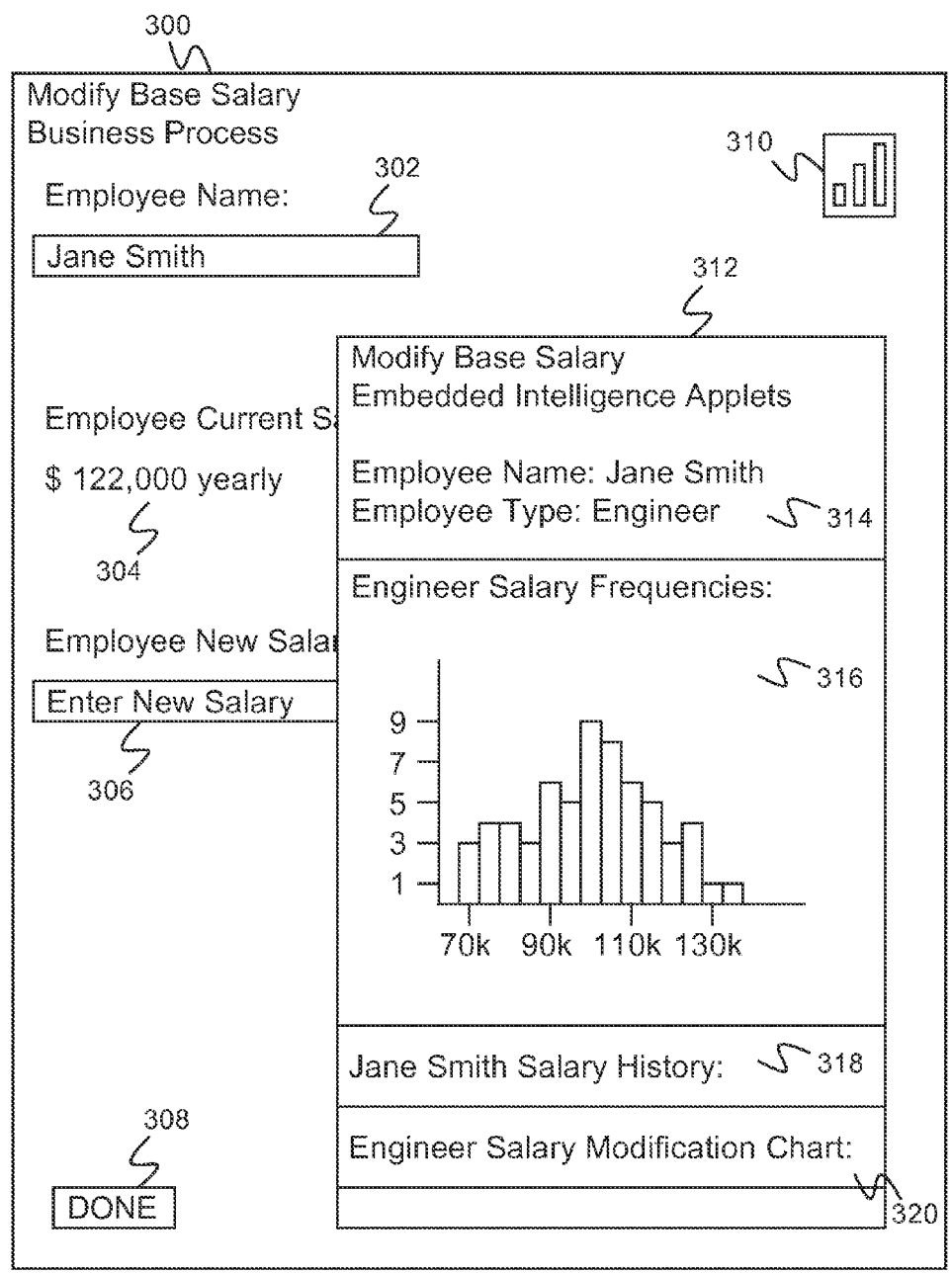
FIG. 3 is a diagram illustrating an embodiment of a business process including an embedded intelligence applet window displaying in an opaque mode.

FIG. 3 is a diagram illustrating an embodiment of a business process including an embedded intelligence applet window displaying in an opaque mode. In some embodiments, business process 300 comprises business process 208 of FIG. 2. In some embodiments, business process 300 is executed by database system user 104 of FIG. 1. In the example shown, business process 300 comprises a modify base salary business process. In some embodiments, a modify base salary business process comprises a process for modifying the base salary of an employee. Business process 300 includes employee name field 302. In some embodiments, employee name field 302 comprises a data entry field for entering an employee name. In some embodiments, data entered into employee name field 302 comprises an updatable temporary data. In some embodiments, when an employee name is entered into employee name field 302, employee data related to the employee indicated by the employee name is retrieved from a database (e.g., business data storage 206 of FIG. 2). In the example shown, business process 300 additionally includes employee current salary data 304. In some embodiments, employee current salary data 304 comprises current salary data related to the employee indicated by the employee name entered into employee name field 302. In the example shown, business process 300 additionally comprises employee new salary field 306. In some embodiments, employee new salary field 306 comprises a data entry field for entering a new salary for the employee indicated by the employee name entered into employee name field 302. In some embodiments, data entered into employee new salary field 306 comprises an updatable temporary data. Business process 300 additionally comprises done button 308. In some embodiments, done button 308 comprises a button for indicating that the modify base salary business process is complete. In some embodiments, when an indication is received by done button 308, the base salary associated with the name entered into employee name field 302 is modified to the value indicated in employee new salary field 306. In some embodiments, modifying the base salary associated with the name entered into employee name field 302 comprises modifying a value stored in a data storage (e.g., business data storage 206 of FIG. 2). In some embodiments, business process 300 additionally includes a cancel button for exiting the business process without performing any data modification. In some embodiments, business process 300 additionally includes a next page button for accessing a next page of data and data entry fields. In some embodiments, business process 300 additionally includes a previous page button for accessing a previous page of data and data entry fields.

In the example shown, business process 300 additionally includes embedded intelligence applet display button 310. In some embodiments, when an indication is received by embedded intelligence applet display button 310, embedded intelligence applet window 312 is displayed. Embedded intelligence applet window 312 comprises information related to embedded intelligence applets (e.g., embedded intelligence applet 210 and embedded intelligence applet 212 of FIG. 2). In the example shown, embedded intelligence applet window 312 comprises embedded intelligence applets related to a modify base salary business process. Employee type embedded intelligence applet 314 displays the employee type related to the employee indicated in employee name field 302. Salary frequencies embedded intelligence applet 316 displays salary frequencies for the employee type shown by employee type embedded intelligence applet 314. Salary history embedded intelligence applet 318 comprises a salary history for the employee indicated in employee name field 302 and is shown minimized. Salary modification chart embedded intelligence applet 320 comprises a modification chart of salaries of employees of the employee type shown by employee type embedded intelligence applet 314 and is shown minimized. In the example shown, embedded intelligence applet window 312 displays in an opaque mode (e.g., obscuring information displayed behind it). In some embodiments, indicating to activate a window other than embedded intelligence applet window 312 causes an indication to display embedded intelligence applet window 312 in a transparent mode (e.g., revealing information displayed behind it). In some embodiments, when embedded intelligence applet window 312 is displaying in a transparent mode, bringing an indicator (e.g., a mouse cursor) over embedded intelligence applet window 312 without making an indication (e.g., a click) causes embedded intelligence applet window 312 to display in an opaque mode for as long the indicator remains over embedded intelligence applet window 312. In some embodiments, indicating to activate embedded intelligence applet window 312 causes a reindication to display embedded intelligence applet window 312 in an opaque mode.

In some embodiments, a user updates information in the business process, which causes an automatic update to the embedded intelligence applet—for example, an exposed field of the business process is updated, which is input to the embedded intelligence applet that in turn processes its display output accordingly (e.g., performing a search of the database based on the update, determining a new table, graph, etc.). In some embodiments, the embedded intelligence display is hidden or transparent for the automatic update and an indication is displayed (e.g., a flashing icon, a button, etc.) to the user to indicate that the embedded intelligence display has been updated and should be viewed. In some embodiments, the display is unhidden or made opaque by a trigger (e.g., pressing a button, using a mouse button, clicking on an icon, etc.).

FIG. 4 is a diagram illustrating an embodiment of a business process including an embedded intelligence applet window displaying in a transparent mode. In some embodiments, business process 400 comprises business process 300 of FIG. 3. In some embodiments, embedded intelligence applet window 402 comprises embedded intelligence applet information window 312 of FIG. 3. In the example shown, embedded intelligence applet window 402 is displaying in a transparent mode (e.g., revealing information displayed behind it). In some embodiments, embedded intelligence applet window 402 displays in a transparent mode in response to an indication to activate a window other than embedded intelligence applet window 402 (e.g., business process window 400). In the example shown, embedded intelligence applet window 402 displays in a fully transparent mode (e.g., information displayed behind it is completely revealed). In some embodiments, in response to an indication to activate a window other than embedded intelligence applet window 402, embedded intelligence applet window 402 displays in a partially transparent mode. In some embodiments, displaying embedded intelligence applet window 402 in a partially transparent mode comprises displaying information behind it at partial intensity. In some embodiments, displaying embedded intelligence applet window 402 in a partially transparent mode comprises displaying the window in such a way that items underneath are visible (e.g., a window, icons, wallpaper, etc. underneath can also be seen). In some embodiments, displaying embedded intelligence applet window 402 in a partially transparent mode comprises displaying the window with the items underneath overlaid. In some embodiments, displaying embedded intelligence applet window 402 in a partially transparent mode comprises alternating pixels of the window with pixels of the items underneath. In some embodiments, displaying embedded intelligence applet window 402 in a partially transparent mode comprises summing the intensities of the window and the items underneath. In some embodiments, displaying embedded intelligence applet window 402 in a partially transparent mode is accomplished using a custom function. In some embodiments, displaying embedded intelligence applet window 402 in a partially transparent mode is accomplished using a standard function (e.g., setting a window display characteristic as transparent, semi-transparent, etc.). In various embodiments, in response to an indication to activate a window other than embedded intelligence applet window 402, embedded intelligence applet window 402 displays at 10% transparency (e.g., information behind it is displayed at 10% intensity), 25% transparency (e.g., information behind it is displayed at 25% intensity), 50% transparency (e.g., information behind it is displayed at 50% intensity), or any other appropriate transparency level.

Figure 5:
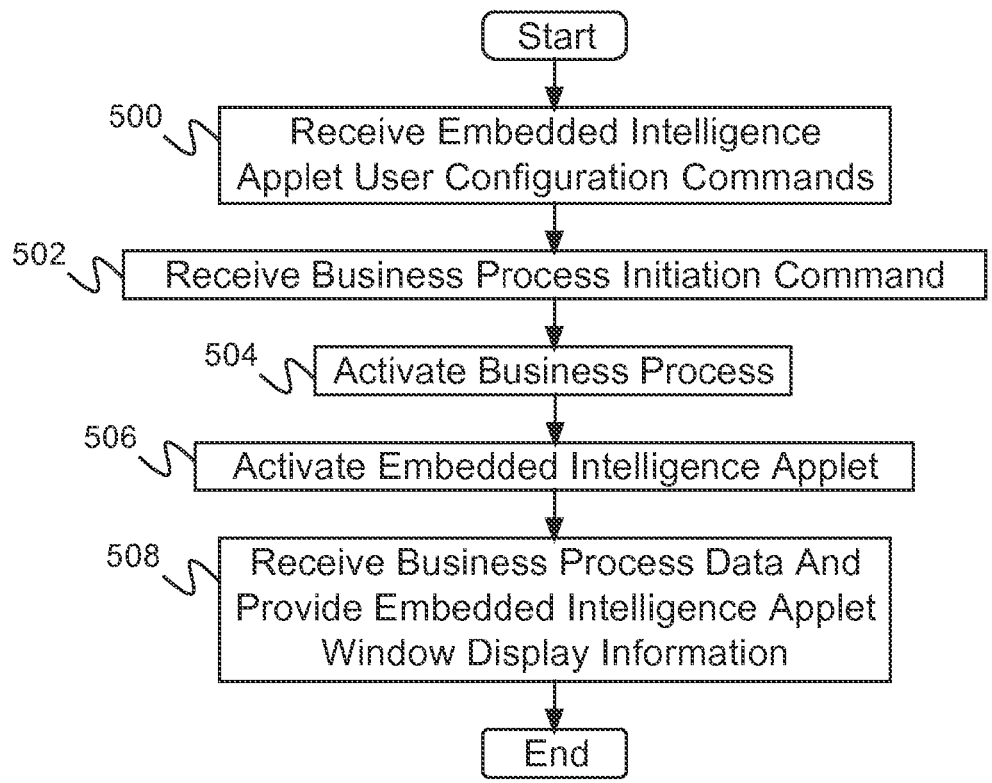
FIG. 5 is a flow diagram illustrating an embodiment of a process for embedded intelligence.

FIG. 5 is a flow diagram illustrating an embodiment of a process for embedded intelligence. In some embodiments, the process of FIG. 5 is executed by database management system 204 of FIG. 2. In some embodiments, the process of FIG. 5 is executed in communication with a database user (e.g., database system user 104 of FIG. 1). In the example shown, in 500, embedded intelligence applet user configuration commands are received. In some embodiments, an embedded intelligence applet is configurable. In some embodiments, embedded intelligence applet user configuration commands comprise user commands for configuring an embedded intelligence applet display. In various embodiments, embedded intelligence applet user configuration commands comprise embedded intelligence applet show/hide window default status commands, embedded intelligence applet sequence commands, embedded intelligence applet open/closed default commands, or any other appropriate embedded intelligence applet user configuration commands. In some embodiments, 500 is skipped and an embedded intelligence applet default configuration is used. In 502, a business process initiation command is received. In some embodiments, a business process initiation command comprises a selection of a business process. In various embodiments, a selection of a business process comprises a selection of a business process from a list of business processes, from a category tree of business processes, from a set of search results for business processes, by typing the name into a business process name field, or in any other appropriate way.

In some embodiments, a business process initiation command is automatically generated, e.g., at a predetermined time, in response to an event, etc. In 504, the business process is activated. In some embodiments, activating the business process comprises executing the business process software. In some embodiments, activating the business process comprises displaying a business process window to a user (e.g., via user interface system 202 of FIG. 2). In some embodiments, a business process window includes a prompt for input. In some embodiments, activating a business process comprises prompting for input. In some embodiments, activating a business process comprises issuing an embedded intelligence applet activation command. In 506, an embedded intelligence applet is activated. In some embodiments, more than one embedded intelligence applet is activated. In some embodiments, activating the embedded intelligence applet comprises displaying an embedded intelligence applet window to a user (e.g., via user interface system 202 of FIG. 2). In some embodiments, activating the embedded intelligence applet comprises executing the embedded intelligence applet software. In some embodiments, activating the embedded intelligence applet comprises activating the embedded intelligence applet hidden and displaying it to a user when an embedded intelligence applet display command is received. In some embodiments, the business process determines whether an embedded intelligence applet display command has been received. In some embodiments, the system is configured (e.g., using embedded intelligence applet user configuration commands received in 500) such that an embedded intelligence applet display command is received automatically upon activating the business process. In some embodiments, one or more embedded intelligence applets are associated with the business process and are predetermined as the embedded intelligence applets to be activated when the business process is activated. In some embodiments, one or more embedded intelligence applets are configured as the embedded intelligence applets to be activated (e.g., using embedded intelligence applet user configuration commands received in 500). In some embodiments, an embedded intelligence applet selection interface is displayed and one or more embedded intelligence applets are selected from the embedded intelligence applet selection interface to be activated. In 508, business process data is received and embedded intelligence applet window display information is provided.

Figure 6:
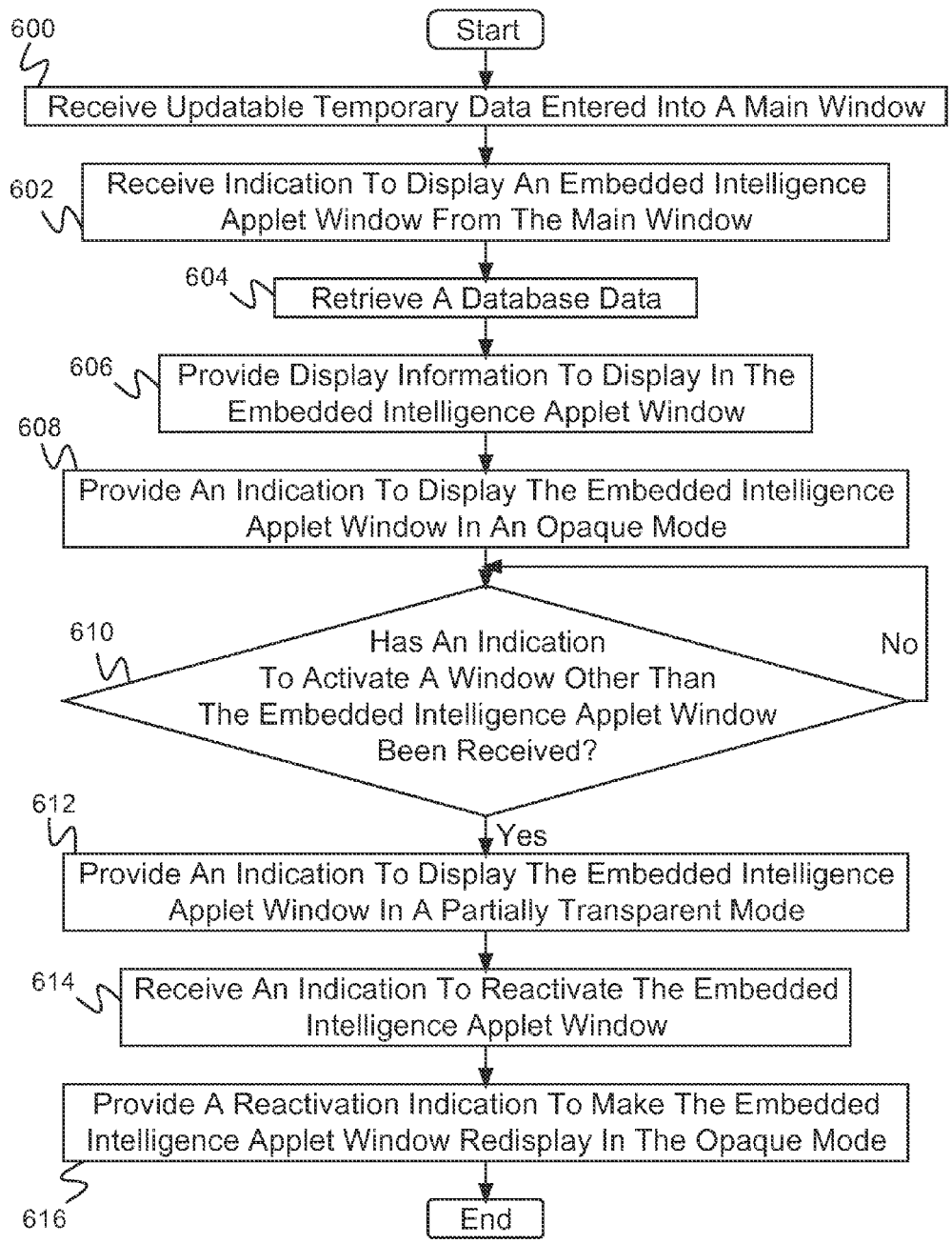
FIG. 6 is a flow diagram illustrating an embodiment of a process for receiving business process data and providing embedded intelligence applet window display information.

FIG. 6 is a flow diagram illustrating an embodiment of a process for receiving business process data and providing embedded intelligence applet window display information. In some embodiments, the process of FIG. 6 implements 508 of FIG. 5. In some embodiments, the process of FIG. 6 comprises a process for a display for embedded intelligence. In the example shown, in 600, updatable temporary data entered into a main window is received. In some embodiments, updatable temporary data is entered into a data entry field (e.g., employee name field 302 of FIG. 3 or employee new salary field 306 of FIG. 3). In some embodiments, a main window comprises a business process (e.g., business process 300 of FIG. 3). In 602, an indication to display an embedded intelligence applet window from the main window is received. In some embodiments, the embedded intelligence applet window comprises embedded intelligence applet window 312 of FIG. 3. In some embodiments, an indication to display an embedded intelligence applet information window is received by an embedded intelligence applet display button (e.g., embedded intelligence applet display button 310 of FIG. 3). In some embodiments, an indication to display an embedded intelligence applet window is received upon activation of the embedded intelligence applet (e.g., activation of the embedded intelligence applet performed in 506 of FIG. 5). In 604, a database data is retrieved. In some embodiments, a database data is retrieved from a database (e.g., business data storage 206 of FIG. 2). In some embodiments, a database data is retrieved based at least in part on the updatable temporary data. In 606, display information to display the embedded intelligence applet window is provided. In some embodiments, the display information is provided to a display. In some embodiments, the embedded intelligence applet window display information is determined based at least in part on the database data and the updatable temporary data. In some embodiments, the display information comprises database data. In various embodiments, the display information comprises text, graphs, tables, charts, video, or any other appropriate display information. In 608, an indication is provided to display the embedded intelligence applet window in an opaque mode (e.g., an opaque mode as shown in FIG. 3).

In 610, it is determined whether an indication to activate a window other than the embedded intelligence applet window has been received. In some embodiments, an indication to activate the window other than the embedded intelligence applet window comprises a click on the window other than the embedded intelligence applet window. In some embodiments, the window other than the embedded intelligence apple window comprises a business process window. In some embodiments, the window other than the embedded intelligence applet window comprises a text entry window. If it is determined that an indication to activate a window other than the embedded intelligence applet window has not been received, 610 repeats. If it is determined that an indication to activate a window other than the embedded intelligence applet window has been received, control passes to 612. In 612, an indication to display the embedded intelligence applet window in a partially transparent mode (e.g., a partially transparent mode as described in the section regarding FIG. 4) is provided. In 614, an indication to reactivate the embedded intelligence applet window is received. In some embodiments, an indication to reactivate the embedded intelligence applet window comprises a temporary indication to reactivate the embedded intelligence applet window (e.g., the embedded intelligence applet window is only reactivated for as long as the indication is received). In some embodiments, a temporary indication to reactivate the embedded intelligence applet window comprises moving the cursor over the embedded intelligence applet window. In some embodiments, an indication to reactivate the embedded intelligence applet window comprises a permanent indication to reactivate the embedded intelligence applet window (e.g., the embedded intelligence applet window is reactivated until an indication to activate a window other than the embedded intelligence applet window is received). In some embodiments, a permanent indication to reactivate the embedded intelligence applet window comprises a click on the embedded intelligence applet window. In 616 a reactivation indication to make the embedded intelligence applet window redisplay in the opaque mode is provided.

In some embodiments, a display of an embedded intelligence applet is embedded in the display of the business process. Embedded intelligence applet information is updated automatically in the event that an indication is received that there is an update to the embedded intelligence applet information. The display information is updated automatically regardless of whether the display is currently visible or hidden. In some embodiments, the embedded display information is hidden in the event that the business process information is edited. In some embodiments, in the event that the embedded intelligence applet information is updated, an indicator indicates (e.g., an icon, a blinking button, etc.) that the embedded intelligence applet information has been updated. In some embodiments, the embedded intelligence applet information is displayed in the event an icon is selected or a button is pushed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying an embedded intelligence applet, comprising:
   a processor configured to:
   receive an indication to select a business process with an associated embedded intelligence applet, wherein the business process comprises modifying employee and business information stored in a database;
   provide business process information to display in a main transaction window and a set of prompts for a first input data for a first field in the database and a second input data for a second field in the database;
   receive the first input data into the business process, wherein the first input data corresponds to a current value of the first field;
   determine the business process information to display in the main transaction window, wherein determining the business process information comprises to:
   search the database for employee data related to the business process; and
   retrieve a current value for the second field from the database based on the first input data;
   determine display information to display in an embedded intelligence applet window based at least in part on the first input data, wherein the display information for the embedded intelligence applet comprises the employee and business information stored in the database that assists a business manager with decisions made during the business process, wherein the display information further comprises one or more of graphs, tables, or charts based on the employee and business information stored in the database;
   provide the display information to display in the embedded intelligence applet window, wherein the embedded intelligence applet is in a pre-defined area of the main transaction window and overlaps the business process information;
   provide an indication to display the embedded intelligence applet window in an opaque mode;
   receive the second input data into the business process, wherein the second input data updates the current value of the second field to an updated value;
   provide an updated display information to display in the embedded intelligence applet window including by automatically making real time updates to the display information based at least in part on the updated value of the second field;
   determine whether an indication to activate a window other than the embedded intelligence applet window was received, wherein the embedded intelligence applet window is displayed in a partially transparent mode in response to a determination that an indication to activate another window was received; and
   in the event that the embedded intelligence applet window is displayed in a partially transparent mode, provide an indication to display an alert that the embedded intelligence applet window has been updated; and
   receive an indication to reactivate the embedded intelligence applet window;
   provide a reactivation indication to make the embedded intelligence applet window redisplay in the opaque mode; and
   a memory coupled to the processor and configured to provide the processor with instructions.

2. The system of claim 1, wherein the indication to reactivate the embedded intelligence applet window comprises a temporary indication to reactivate the embedded intelligence applet window.

3. The system of claim 2, wherein the temporary indication to reactivate the embedded intelligence applet window comprises moving a cursor over the embedded intelligence applet window.

4. The system of claim 1, wherein the indication to reactivate the embedded intelligence applet window comprises a long term indication to reactivate the embedded intelligence applet window.

5. The system of claim 4, wherein the long term indication to reactivate the embedded intelligence applet window comprises a click on the embedded intelligence applet window.

6. The system of claim 1, wherein the indication to activate the window other than the embedded intelligence applet window comprises a click on the main transaction window comprising the business process information.

7. The system of claim 1, wherein the window other than the embedded intelligence applet window comprises a text entry window.

8. The system of claim 1, wherein displaying a window in a partially transparent mode comprises displaying the window in such a way that items underneath are visible.

9. The system of claim 8, wherein displaying the window in such a way that items underneath are visible comprises displaying the window with the items underneath overlaid.

10. The system of claim 8, wherein displaying the window in such a way that the items underneath are visible comprises alternating pixels of the window with pixels of the window underneath.

11. The system of claim 8, wherein displaying the window in such a way that the items underneath are visible comprises summing the intensities of the window and the items underneath.

12. The system of claim 1, wherein displaying a window in a partially transparent mode is accomplished using a standard function.

13. The system of claim 1, wherein displaying a window in a partially transparent mode is accomplished using a custom function.

14. The system of claim 1, wherein the display information further comprises one or more of the following: text or video.

15. A method for displaying an embedded intelligence applet, comprising:
   receiving an indication to select a business process with an associated embedded intelligence applet, wherein the business process comprises modifying employee and business information stored in a database;
   providing business process information to display in a main transaction window and a set of prompts for a first input data for a first field in the database and a second input data for a second field in the database;
   receiving input data into the business process, wherein the first input data corresponds to a current value of the first field;
   determining the business process information to display in the main transaction window, wherein determining the business process information comprises:

searching the database for employee data related to the business process; and
retrieving a current value for the second field from the database based on the first input data;
determining display information to display in an embedded intelligence applet window based at least in part on the first input data, wherein the display information for the embedded intelligence applet comprises the employee and business information stored in the database that assists a business manager with decisions made during the business process, wherein the display information further comprises one or more of graphs, tables, or charts based on the employee and business information stored in the database;
providing the display information to display in the embedded intelligence applet window, wherein the embedded intelligence applet is in a pre-defined area of the main transaction window and overlaps the business process information;
providing an indication to display the embedded intelligence applet window in an opaque mode;
receiving the second input data into the business process, wherein the second input data updates the current value of the second field to an updated value;
providing an updated display information to display in the embedded intelligence applet window including by automatically making real time updates to the display information based at least in part on the updated value of the second field;
determining, using a processor, whether an indication to activate a window other than the embedded intelligence applet window was received, wherein the embedded intelligence applet window is displayed in a partially transparent mode in response to a determination that an indication to activate another window was received; and
in the event that the embedded intelligence applet window is displayed in a partially transparent mode, providing an indication to display an alert that the embedded intelligence applet window has been updated;
receiving an indication to reactivate the embedded intelligence applet window; and
providing a reactivation indication to make the embedded intelligence applet window redisplay in the opaque mode.

16. A computer program product for displaying an embedded intelligence applet, the computer program product being stored in a tangible and non-transitory computer readable storage medium and comprising computer instructions that when executed cause a processor to perform the steps of:
receiving an indication to select a business process with an associated embedded intelligence applet, wherein the business process comprises modifying employee and business information stored in a database;
providing business process information to display in a main transaction window and a set of prompts for a first input data for a first field in the database and a second input data for a second field in the database;
receiving the first input data into the business process, wherein the first input data corresponds to a current value of the first field;
determining the business process information to display in the main transaction window, wherein determining the business process information comprises:
searching the database for employee data related to the business process; and
retrieving a current value for the second field from the database based on the first input data;
determining display information to display in an embedded intelligence applet window based at least in part on the first input data, wherein the display information for the embedded intelligence applet comprises the employee and business information stored in the database that assists a business manager with decisions made during the business process, wherein the display information further comprises one or more of graphs, tables, or charts based on the employee and business information stored in the database;
providing the display information to display in the embedded intelligence applet window, wherein the embedded intelligence applet is in a pre-defined area of the main transaction window and overlaps the business process information;
providing an indication to display the embedded intelligence applet window in an opaque mode;
receiving an indication that one or more modifications are made to the input data into the business process;
receiving the second input data into the business process, wherein the second input data updates the current value of the second field to an updated value;
providing an updated display information to display in the embedded intelligence applet window including by automatically making real time updates to the display information based at least in part on the updated value of the second field;
determining whether an indication to activate a window other than the embedded intelligence applet window was received, wherein the embedded intelligence applet window is displayed in a partially transparent mode in response to a determination that an indication to activate another window was received; and
in the event that the embedded intelligence applet window is displayed in a partially transparent mode, providing an indication to display an alert that the embedded intelligence applet window has been updated;
receiving an indication to reactivate the embedded intelligence applet window; and
providing a reactivation indication to make the embedded intelligence applet window redisplay in the opaque mode.

17. A system for displaying an embedded intelligence applet, comprising:
a processor configured to:
receive an indication to select a business process with an associated embedded intelligence applet, wherein the business process comprises modifying employee and business information stored in a database;
provide business process information to display in a main transaction window and a set of prompts for a first input data for a first field in the database and a second input data for a second field in the database;
receive the first input data into a business process, wherein the first input data corresponds to a current value of the first field;
determine the business process information to display in the main transaction window, wherein determining the business process information comprises to:
search the database for employee data related to the business process; and
retrieve a current value for the second field from the database based on the first input data;
determine display information to display in an embedded intelligence applet window based at least in part on the first input data, wherein the display information for the embedded intelligence applet comprises the employee and business information stored in the database that assists a business manager with decisions made during the business process, wherein the display information further comprises one or more of graphs, tables, or charts based on the employee and business information stored in the database;

provide the display information to display in the embedded intelligence applet window, wherein the embedded intelligence applet is in a pre-defined area of the main transaction window and overlaps the business process information;

receive the second input data into the business process, wherein the second input data updates the current value of the second field to an updated value;

provide an updated display information to display in the embedded intelligence applet window including by automatically making real time updates to the display information based at least in part on the updated value of the second field;

determine whether an indication to hide the embedded intelligence applet window has been received; and in the event that the embedded intelligence applet window is hidden, provide an indication to display an alert that the embedded intelligence applet window has been updated;

receive an indication to reactivate the embedded intelligence applet window;

provide a reactivation indication to make the embedded intelligence applet window redisplay in the opaque mode; and a memory coupled to the processor and configured to provide the processor with instructions.

18. The system as in claim 17, wherein the alert comprises an icon that the embedded intelligence applet information has been updated.

19. The system as in claim 17, wherein the alert comprises a blinking button that the embedded intelligence applet information has been updated.

* * * * *